United States Patent
Minkus

[15] 3,693,351
[45] Sept. 26, 1972

[54] ANTI-POLLUTION REGENERATIVE ENGINE

[72] Inventor: Herbert L. Minkus, Chicago, Ill.

[73] Assignee: Albert M. Sheppard, Chicago, Ill. part interest

[22] Filed: Jan. 29, 1971

[21] Appl. No.: 108,064

[52] U.S. Cl. .................. 60/57 R, 60/59 R, 92/147
[51] Int. Cl. ............................................. F01b 1/00
[58] Field of Search ......... 60/57 R, 59 R, 62; 91/412; 92/147, 149

[56] References Cited

UNITED STATES PATENTS

| 27,938 | 4/1860 | Turnbull | 60/57 R |
| 685,704 | 10/1901 | Wilkinson | 60/62 X |
| 859,235 | 7/1907 | MacFarren | 60/62 X |
| 865,496 | 9/1907 | Herrington | 60/57 R |
| 1,206,493 | 11/1916 | Wulferding | 60/57 R UX |

*Primary Examiner*—Edgar W. Geoghegan
*Attorney*—Alter, Weiss & Whitesel

[57] ABSTRACT

Air motor cylinders are paired, with one cylinder having a greater volume than the other. Lever arms attached to two pistons in these cylinders have a length differential which compensates for the volume differential so that both pistons perform the same amount of work on a load device. Attached to a drive shaft for driving the load device is a tachometer which indicates when the load is applied or removed. When the tachometer indicates that the load has slackened, valves operate so that one of the cylinders ceases to act as a driving force and acts, instead, as a compressor, thereby returning air to a compressed air tank. Thus, during a slack load conditions, the compression cylinder stores energy to drive the system during high load conditions.

11 Claims, 2 Drawing Figures

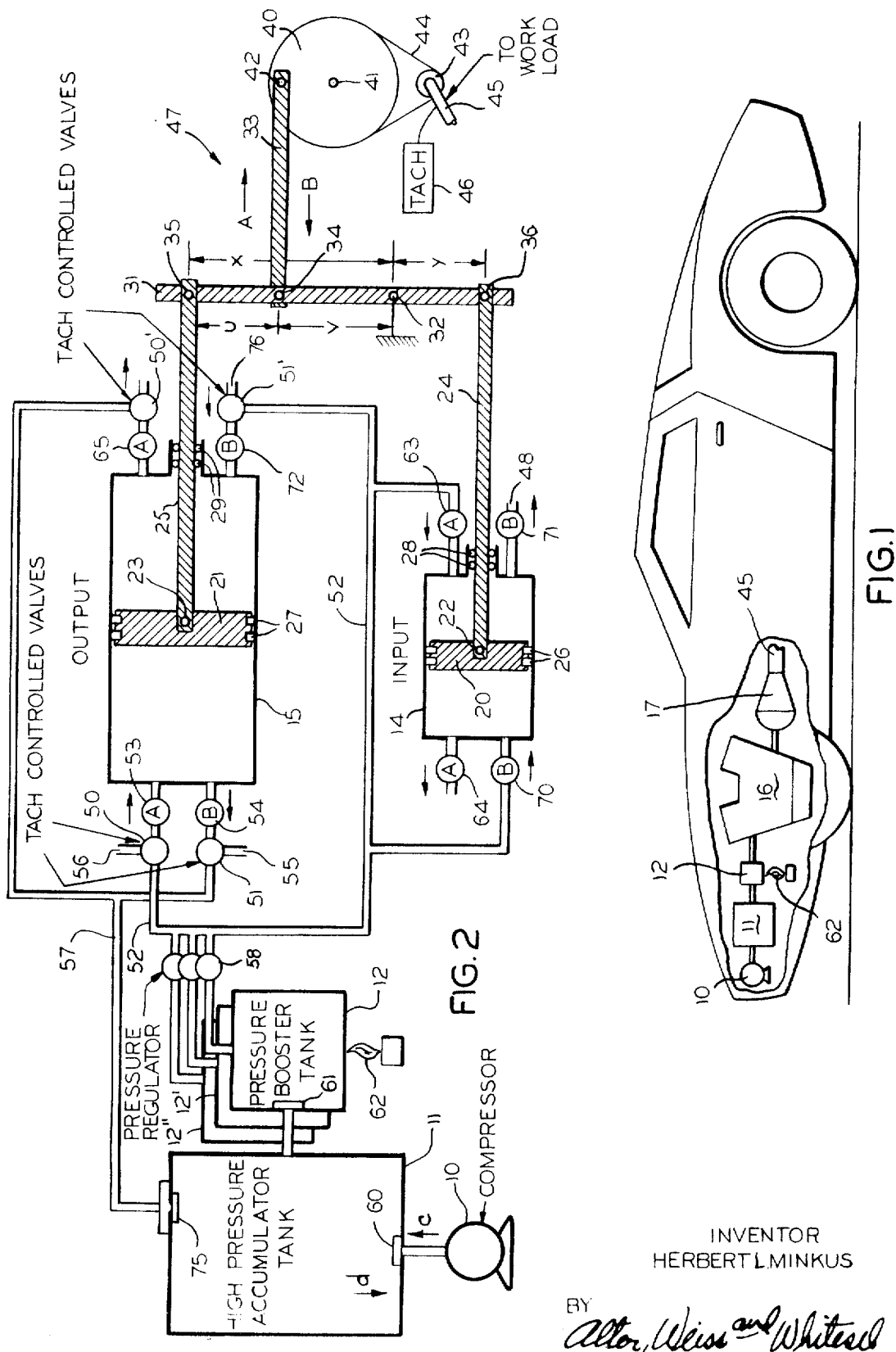

ANTI-POLLUTION REGENERATIVE ENGINE

This invention relates to anti-pollution engines and more particularly to push-pull hot air motors with a regenerative compressed air feed during unloaded or negative load conditions.

Primarily the invention contemplates a clean air motor or engine for an automobile; however, the motor has universal use for driving any suitable load device. In greater detail, the present day internal combustion engine is blamed for air pollution, especially in densely populated centers, such as large cities. Accordingly, there is a need for a clean air motor which will propel an automobile without contributing to further pollution. While it is desirable for such a motor to propel the automobiles at great speeds, this is not necessarily a primary objective. Quite the contrary, the air pollution problems are most severe in the more densely populated centers where low speeds of 35 mph., or less, are more than adequate.

One form of motor which should be ideal for solving air pollution problems, for city driving, is run by heated compressed air. Air motors are compact, lightweight sources of smooth, vibrationless power, and they cannot be harmed by overloading. In common with most fluid motors, they have high torque and power, per pound of weight. There is no significant heat build-up when air motors are stalled for considerable lengths of time. Air motors may stop and start instantly and provide an infinitely variable control of torque and speed. However, as with most machinery, there are many advantages if these motors are designed to run continuously and under substantially uniform load.

These air motors cannot directly convert energy released by an unregulated expansion of compressed air into a mechanical converter since the cooling effect, obtained when air or gas expands, limits the amount of expansion that can be used effectively. If air were expanded through an air motor at a high ratio of initial compression to final expansion, there would be a freezing of moisture in the air motor. Therefore, the air motor is designed to use air at a regulated line pressure working on a piston head.

These piston-type air motors may have any suitable number of cylinders, arranged in any suitable positions, such as a V-8 configuration, for example. Output torque is developed by pressure working on a piston confined within each of these cylinders. More power is obtained by using a motor with a higher speed revolution, larger piston diameter, more pistons, or increased stroke.

Accordingly, it is apparent that air motors are ideally suited to driving automobiles. Since these motors can lug heavy loads at all speeds, they are particularly adaptable to slow-speed operation, and especially to driving automobiles at low city speeds. However, there are practical problems since the compressed air tanks would be prohibitively large to drive the auto for even a short distance, and increased compression ratios do not solve the problems. On the other hand, much of city driving is stop and go, pulling and coasting, etc. Therefore, if the automobile's primary motive power source is used to store compressed air at all times when the power source is not pulling the automobile, the compressed air tank can be made much smaller.

Accordingly, an object of the invention is to provide a clean air, pollution-free automobile by taking advantage of all of these and other desirable features of air motors. In particular, an object is to provide an air motor which runs at constant speeds and under uniform loading, despite widely fluctuating load conditions. Here an object is to maintain a uniform dynamic inertia, despite widely fluctuating load conditions.

Another object is to provide an air motor which automatically returns energy to the system during unloaded, lightly loaded, or even negatively loaded conditions. In this connection, an object is to almost instantly perform substantial work functions and to run smoothly when the work load is removed.

Yet another object of the invention is to provide an automobile driven by compressed air. Here an object is to provide an automobile with an air motor which delivers a full power output at all times, with the excess power being used to store energy, by compressing air, during periods while the automobile is not otherwise drawing full power. In particular, an object is to provide an automobile especially well suited for stop and go driving in crowded city streets.

In keeping with an aspect of the invention, air motor cylinders are paired with a piston in one cylinder having a shorter stroke than the piston in the other cylinder. Lever arms attached to the two pistons have a length differential which compensates for the stroke differential, so that both pistons perform the same amount of work on a load device. A tachometer attached to a shaft driving the load indicates when the load is applied or removed. When the tachometer indicates that the load has slackened, valves operate so that one of the cylinders ceases to act as a driving cylinder and acts, instead, as a compressor, thereby returning air to a compressed air tank. Thus, during slack load conditions, the compression cylinder stores energy to drive the system during high load conditions.

For example, if the air motor is used as the prime driving source for an automobile which runs up hills and down hills, the compressed air is expended to drive the automobile uphill. As the automobile runs down hill, its falling weight rotates the air motor and thereby stores compressed air. Thus, the work performed by the falling weight of the automobile is stored, as energy, in the form of compressed air. Likewise, each time that the automobile stops, the motor continues to run, and power is stored to drive the automobile when it starts again. Thus, the air motor runs smoothly, as if it were exposed to a uniform and unvarying load regardless of whether the automobile is running uphill, downhill, through traffic, or when stopped at a traffic light.

The nature of a preferred embodiment of the invention for accomplishing these and other objects may be understood best from a study of the following description and the attached drawing in which:

FIG. 1 schematically shows an automobile driven by the inventive compressed air system, with part of the hood broken away to show such system in the schematic form of a block diagram, and FIG. 2 schematically shows a pair of air cylinders, and the controls for an associated compressed air line, required to realize the invention.

Briefly, FIG. 1 shows an automobile with the hood area partially broken away to show the inventive source of motive power. This source includes a relatively small compressor 10 which may be driven by any suitable small engine to store compressed air in air accumulation tank 11. One or more booster tanks 12 increase air pressure by a relatively non-polluting means, such as being heated by a heat source 62. The air in the boosted pressure tank 12 drives an air motor 16 which includes a number of paired pistons, here shown in an exemplary V-configuration. The air motor 16 is connected to a transmission 17 of a conventional type. Except for this power source, the automobile of FIG. 1 is conventional.

FIG. 2 shows the mechanical parts of the air system in heavily inked lines; the moving pistons, shafts, and levers are shown by crosshatching; and the air line is shown by parallel lines. More particularly, the air system includes the compressor, the high pressure accumulator tank 11, and the booster tank 12. Three tanks 12, 12' and 12" are here shown so that one tank is always being pressurized, one pressurized tank is on stand-by, and one tank is being exhausted. The air motor includes a pair of air cylinders 14, 15 — having short and long strokes respectively. The short stroke cylinder 14 is a driving or input device which always furnishes motive power for the total system. The long stroke or output cylinder 15 may either supplement the cylinder 14 by providing a driving force; or it may also serve as a compressor and act as a load by returning compressed air to the high pressure accumulation tank 11, during periods when the automobile is not using full motor power.

The moving parts of the system include a pair of pistons 20 and 21, in the short stroke cylinder 14 and the long stroke cylinder 15, respectively. Wrist pins 22, 23 pivotally attach first and second connecting rods 24, 25 to the pistons 20, 21, respectively. Any suitable packing means, such as piston rings or Teflon O-rings, 26, 27, seal the pistons 20, 21 to the walls of the cylinders 14, 15, respectively. Likewise, similar packing means 28, 29 seal the rods 24, 25, respectively, to sleeves in the cylinders 26, 27. While the drawing shows only two cylinders 14, 15, it should be understood that any suitable number (such as four, six, or eight) could be provided in a straight line, a V-configuration, or a radial arrangement. In automobiles, the V-configuration is preferred.

The connecting rods 24, 25 are interconnected by a rocker arm 31, pivoted at a fixed or ground point 32. The useful work load is taken from a third connecting rod 33 which is attached to the rocker arm 31 at the point 34. The length of the rocker arm 31 is divided into two parts. One rocker arm part X is measured from ground point 32 to the connecting rod 25 pivot point 35. The other rocker arm part Y extends from the ground point 32 to the connecting rod 24 pivot point 36.

The longer part X of the rocker arm 31 is divided into two parts U and V. The part U extends between the load take off point 34 and the connecting rod 25 point 35. The other part V extends between the load take off point 34 and the ground point 32. The relative lengths of the lever arms U, V, X, and Y are selected with respect to the lengths of the two piston strokes so that both cylinders contribute essentially the same driving force to the connecting rod 33.

In the larger size motors with many cylinders, the construction is more nearly like the construction of conventional automobile engines with conventional piston rings, crank cases, and compression appears on only one side of the piston. If the air motor is a large and complex one, somewhat similar in construction to an automobile engine, the same lever arm differential (X–Y) may be provided by using a crank shaft having throws of different lengths. Of course, care is taken to maintain a dynamic engine balance.

While the foregoing description speaks of the air motor as the prime mover for driving an automobile, the exact nature of the load is not too relevant. However, for a schematic disclosure, the load device is here shown as a driven fly wheel 40 rotating about an axle 41 responsive to the reciprocating motion of connecting rod 33 acting upon a pin 42 near the rim of the wheel 40. The fly wheel axle 41 could impart motion directly; or, a suitable speed reduction gearing (e.g., transmission 17) may be provided. As here shown, for schematic purposes, the speed reduction is accomplished by providing a small pulley wheel 43 driven by a belt 44. The drive shaft 45 rotates responsive to the power applied to the pulley 43.

A tachometer 46 detects the varying load conditions experienced by the shaft 45. Thus, when a load is applied to the shaft 45, there is a slight tendency for the shaft to slow, and the tachometer 46 so indicates. In the above-slated analogy, this is somewhat like a driven automobile going uphill. On the other hand, if the load is removed, or tends to become negative, the shaft 45 tends to speed up, and the tachometer 46 so indicates. For example, there is no load if the automobile stops at a traffic light; or, shaft 45 experiences a negative load if the automobile runs downhill.

The letters A and B are used to indicate the two reciprocating motions of the connecting rod 33, as indicated in the drawing near the reference character 47. These two letters A and B are also used in circles elsewhere in the drawing to identify valves which open and close responsive to the movement of shaft 33. Thus, all A valves open (and all B valves close) when the shaft 33 moves in the direction A. Conversely, all B valves open (and all A valves close) when the shaft 33 moves in the direction B.

Vents to the atmosphere are shown by two short, open end lines, as at 48, for example.

On the cylinder 15, a pair of valves, 50, 51 and 50', 51' are controlled responsive to signals from the tachometer 46. Thus, when the shaft 45 is running under a substantial load, the tachometer signal sets the valves 50, 51 to extend the air line 52 to the A valve 53, and the B valve 54 to the atmosphere vent, respectively. When the shaft 45 is running under a reduced load, no load, or a negative load, the tachometer signal sets the valves 50, 51 to connect the A valve 53 to the atmosphere vent 56 and the B valve 54 to the air line 57, respectively. Similar results occur at the valves 50' and 51'.

A pressure regulator 58 may take any suitable form. Its chief function is to admit a predetermined amount of air pressure to the air line 52, regardless of the pressure in the booster tanks 12 (assuming that the tank pressure is at least high enough to maintain the line pressure). Thus, the expansion of air in the cylinders 14, 15 is always constant and below the level which might cause ice to form.

A number of pressure actuated valves are shown in the drawing by small rectangles, such as 60. For example, if the air pressure from compressor 10 exceeds air pressure in tank 11, the valve 60 opens and air passes from the compressor 10 into the tank 11. However, if pressure 11 is the greater, valve 60 is closed, and air cannot pass from the tank 11 to the compressor 10.

With the foregoing description of the apparatus and components in mind, it is thought that the invention will best be understood by the following step-by-step description of the work cycle.

First, the compressor 10 fills tank 11 to the maximum supplied pressure. Thereafter, the compressor 10 operates on demand. Whenever the line pressure $c$ drops, the compressor 10 starts and repressurizes the tank 11. Thus, the tank 11 rarely falls below a predetermined pressure.

THe air in tank 11 passes through valve 61 to fill a first of the booster tanks 12. A flame 62 symbolically indicates that energy is added to further increase the air pressure at this point in the system. Thus, there is an air pressure differential between tanks 11 and 12. To insure a constant supply of air at such a boosted pressure, a plurality of booster tanks 12 may be provided with one tank 12 being pressurized while another tank 12' is being exhausted, and a fully pressurized tank 12" is standing by. While the flame 62 implies that pressure is increased by heating the compressed air, the invention is broad enough to cover any suitable pressure booster system. The tank 11 is fairly large to enable storage of a sufficient amount of air, which is subject to pressure fluctuation. The three booster tanks 12 are fairly small, and enough energy is provided at 62 to avoid substantially all pressure fluctuation. The pressure regulators 58 further attenuate any pressure fluctuations which might otherwise occur in the line 52. Thus, the air line 52 is supplied with a well regulated air pressure.

Next, assume that the connecting rod 33 is moved in direction A. All of the A valves open, and all of the B valves close. Air from line 52 passes through the A valve 63 to drive the piston 20 to the left, as viewed in FIG. 2. The moving piston 20 pushes air out the A valve 64 and into the atmosphere. Also, air in line 52 passes through valves 50, 53 to drive the piston 21 to the right, as viewed in FIG. 2. Air is pushed out of cylinder 15 via the valves 65 and 50'.

The rod 24 slides to the left, the rod 25 slides to the right, and rocker arm 31 rocks in a clockwise direction about the ground point 32. The connecting rod 33 moves to the right, and wheel 40 turns in a clockwise direction.

When the rod 33 reaches the end of its rightward stroke, the A valves close, and the B valves open. The valves operate in any well known manner such as through the use of pressure differentials or through the use of lifter arms operated by cams. The B valve 70 admits air from line 52 to push the piston 20 to the right, as viewed in FIG. 2. The moving piston 20 pushes air out the B valve 71, and into the atmosphere at vent 48. The air in line 52 is admitted via valve 72 to push the piston 21 to the left. Air is pushed out valves 54 and 51 to the atmosphere at vent 55. The rod 24 moves to the right, rod 25 moves to the left, and rocker arm 31 rocks in a counterclockwise direction. Connector rod 33 moves to the left in direction B, and wheel 40 continues to rotate in a clockwise direction.

As it turns, the fly wheel 40 imparts power through belt 44 to pulley 43 and shaft 45, or through transmission 17 (FIG. 1) to shaft 45.

If the shaft 45 is under load (as when an automobile is moving uphill), the tachometer 46 gives a signal, and the system continues to operate in the described manner. Both pistons 20, 21 contribute approximately the same work force to the motive system, owing to the differentials of lever arm lengths, piston strokes, and the like.

Next, assume that the shaft 45 encounters a slight load, no load (as when an automobile stops) or a negative load (as when the automobile is moving downhill). The tachometer gives a signal which resets the valves 50, 51, 50', and 51'. This valve operation disconnects the line 52 from cylinder 15, and connects line 57 thereto. The air vents 56 and 76 are opened by valves 50, 51'.

The drive or input cylinder 14 continues to work, as before described. When connecting rod 33 moves to the left, the B valves open, and the A valve close. The operation of the valves occurs through the use of the previously mentioned well known means. Air is compressed through valves 54, 51, line 57, valve 75, and into tank 11. The back pressure on the left side of the piston 21 is relieved by air entering at vent 76 and passing through valves 51', 72.

Upon reflection, it should be obvious that the system runs under substantially a full and uniform load. When power is taken from shaft 45, both cylinders apply power to the work load. When less or no power is taken from shaft 45 — or when the load actually drives the shaft — the compression of air within the cylinder 15 is used to repressurize the tank 11. Therefore, the mechanical parts of the system experience a fairly uniform loading regardless of the demands placed upon the system.

The system is regenerative in that the compressed air taken from the system during heavy loading is returned — at least in part — to the system by the compressor action within cylinder 15 during periods of light loading. Moreover, since the average air pressure in the booster tanks 12 is higher than the air pressure in accumulator tank 11, there is a greater potential acting on the input or drive cylinder 14 than is resisting the output of compression cylinder 15. Accordingly, the stroke in cylinder 15 is made larger so that a greater amount of air is compressed and forced into tank 11. The relative lengths of the piston strokes are selected with due regard to the potential resulting from the pressure differential between tanks 11 and 12 and the frictional losses in the system. Thus, if the shaft 45 is unloaded for an extended period of time, the output cylinder 15 is able to compress air into the tank 11 up to the limits set by any safety valve and by the energy supplied at 62 or by a negative loading acting on the shaft 45. In theory, at least, there is no reason why the work done by, say an automobile running downhill for a predetermined distance, could not provide most of the energy required to bring tank 11 up to substantially full pressure. Or in traffic conditions with stop and go driving, the automobile motor stores energy during light loading to help drive the automobile during periods of heavy loading.

From the foregoing, it should be apparent that the invention has particular value when a widely fluctuating load condition is experienced as in stop and go city driving. Moreover, further sophistication allows room for degrees of adjustment. For example, if there are six cylinders in the motor 16, one cylinder 15 could be switched to compression for a slight reduction in shaft loading, two cylinders 15 could be switched for medium load reduction, and three cylinders 15 could be switched for maximum load reduction. Moreover, the foregoing speaks in terms of differential strokes and lever arms. Similar effects may be produced by differential cylinder bores or capacities. The terms "long stroke" and "short stroke" are to be construed to have a meaning broad enough to cover equivalent modifications of bore, or capacity.

Still other modifications will readily occur to those skilled in the art. Therefore, the appended claims are to be construed to cover all equivalent structures which may fall within the spirit and the scope of the invention.

I claim:

1. An air motor comprising means including a tank for accumulating compressed air under a predetermined pressure,
   first cylinder means having a piston with a relatively short stroke and a second cylinder means having a piston with a relatively long stroke.
   means responsive to the air pressure in said accumulating tank for driving at least one of said pistons in at least one of said cylinders,
   means responsive to power from the piston in said one of said cylinders for driving the other of said pistons in the other of said cylinders, and
   means comprising said driven piston in the other cylinder for compressing air in said accumulating tank.

2. The air motor of claim 1 and means for boosting the air pressure between said accumulating tank and said one piston, thereby creating a work potential responsive to a differential of air pressure between the input of said piston and said accumulating tank.

3. The air motor of claim 1 and means for normally coupling said first and second cylinders for the associated pistons to be driven responsive to the air pressure in said tank, and
   means for normally interconnecting said two pistons to apply work to a load device.

4. The air motor of claim 3 and detector means associated with said work load for detecting when there is a reduction in said work load, and
   means responsive to said detection of said work load reduction for switching the coupling to cause said driven piston to supply said compressed air to said tank, whereby said motor tends to run under fairly constant loads.

5. The air motor of claim 3 wherein said interconnecting means comprises a plurality of lever arms having relative lengths which are related to the difference between said strokes so that each of said pistons does substantially the same work with respect to said load device.

6. The air motor of claim 5 wherein said lever arms are coupled to rotate a shaft, and
   said detector means comprises a tachometer for detecting when said shaft speeds up or slows down, and
   means responsive to said tachometer for switching the cylinder having the other of said pistons between a driven mode and a compressing mode of operation.

7. The air motor of claim 6 and pressure regulator means interposed between said tank and said cylinders.

8. The air motor of claim 7 and pressure booster tank means interposed between said pressure regulator and said tank.

9. The air motor of claim 8 wherein there are at least two of said pressure booster tank means and means for pressurizing one of said booster tanks while the other of said booster tanks is being exhausted.

10. The air motor of claim 3 and means for coupling said interconnecting means to drive an automobile transmission.

11. The air motor of claim 10 and means responsive to the weight of an automobile rolling downhill for coupling said other cylinder to apply compressed air to said tank.

* * * * *